Dec. 12, 1939.   J. R. HARMAN   2,183,258
POWER OPERATED ROUTER
Filed Jan. 26, 1938
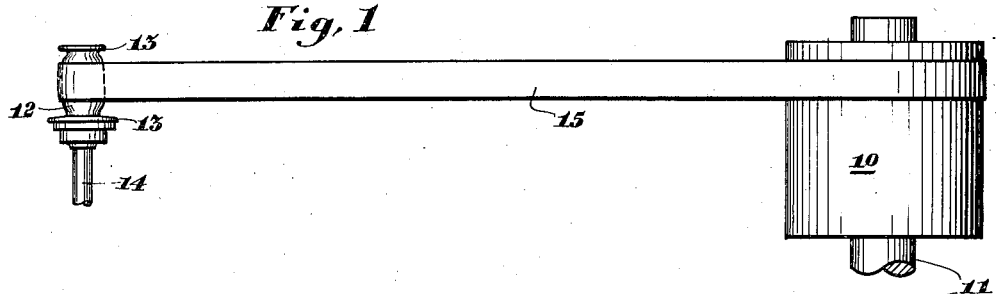
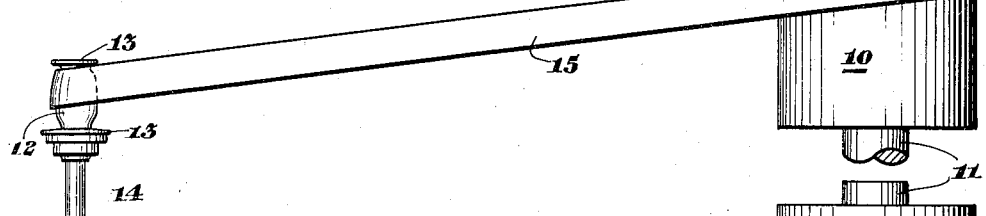
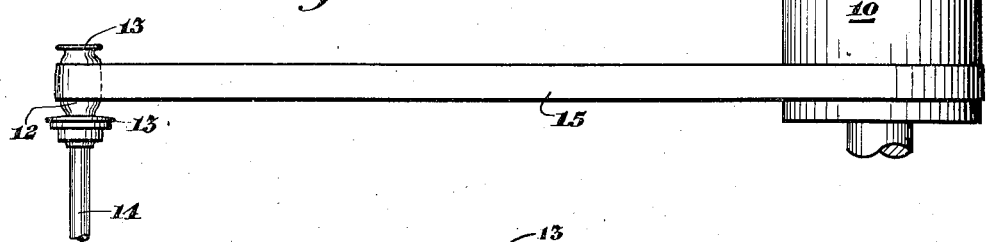
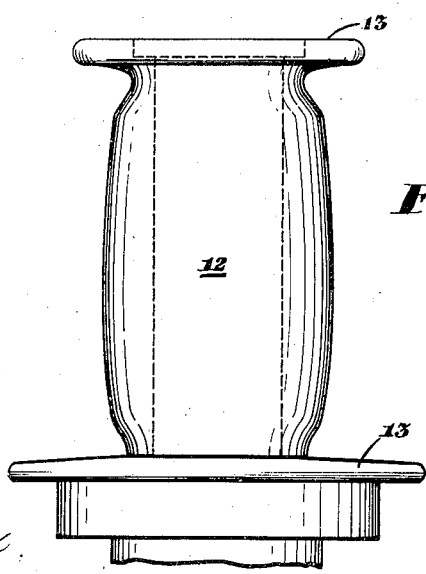
INVENTOR.
James R. Harman
BY
ATTORNEYS.
Witness:
John S. Braddock Patented Dec. 12, 1939

2,183,258

UNITED STATES PATENT OFFICE 2,183,258

POWER OPERATED ROUTER

James R. Harman, Grand Rapids, Mich., assignor to C. O. Porter Machinery Company, Grand Rapids, Mich., a corporation of Michigan Application January 26, 1938, Serial No. 186,955

1 Claim. (Cl. 74—229)

The present invention relates to power operated routers and more particularly to a novel type pulley secured to a driven router spindle or the like.

The primary objects of the instant invention are to provide a pulley for a router spindle or the like so formed that the driving belt carried by the driving and driven pulleys is not caused to curl or wrap along or upon its marginal lengths in instances wherein the driven pulley is axially shifted relative to its driving pulley; to provide such a pulley which quickly causes the belt to shift on its driving pulley with each alternate axially shifted movement of the driven pulley relative to its driving pulley; to provide such a pulley which is efficient in its intended use; to provide such a pulley which is relatively simple in its character; and, to provide such a pulley which is comparatively economical in its manufacture.

An illustrative embodiment of the invention is shown in the accompanying drawing, wherein:

Figure 1 is a side elevational view of a belt carried between a driving pulley and a driven pulley of the instant invention and which driven pulley is mounted upon the upper end of a router spindle or the like;

Figure 2 is a view similar to Figure 1 but showing the driven pulley shifted axially relative to its driving pulley or from a position where the router is in non-work performing position to its work performing position;

Figure 3 is a view of the belt shifted from its position shown in Figure 1 promptly after the driven pulley has been axially shifted from its position shown in Figure 1 to its position shown in Figure 2; and Figure 4 is an enlarged view of the driven pulley per se.

Referring then to the drawing wherein like parts of the power operated construction are designated by the same numerals in the several views, a driving pulley 10 secured to a drive shaft 11 in any suitable manner as by a key and slot connection, not shown, is driven by any suitable source of power as by an electric motor, not shown.

A driven pulley 12 having inwardly rounded ends each provided with a flanged portion 13, is secured to a spindle 14 of a router or the like. The driven pulley 12 is preferably detachably connected with the spindle 14 in any conventional manner although it will be understood of course that the driven pulley and its spindle may be integrally formed if desired.

A belt 15 of leather or the like is carried between the driving pulley 10 and the driven pulley 12 which is of a length less than the length of the driving pulley 10.

In operation and in instances wherein the router spindle 14 with its driven pulley 12 is pedally or manually shifted axially relative to its fixed driving pulley 10 or from its non-work performing position shown in Figure 1 to its work performing position shown in Figure 3, the belt 15 is caused to shift from its position shown in Figure 1, through its position shown in Figure 2 to its position shown in Figure 3 and without curling or wrapping along or upon its upper marginal length which curling or wrapping with its consequent wear and tear normally takes place in instances wherein the axial shifting movement of the driven pulley is of conventional type or character.

Should the belt 15 be quickly shifted from its position shown in Figure 1 through its position shown in Figure 2 to its position shown in Figure 3, the upper length of the belt is sometimes caused to engage the under side of the flanged portion 13 of the driven pulley 12, resulting in momentary curling or wrapping of the belt along or upon its upper marginal length. This curling or wrapping is however infrequent and at best only momentary since the crown of the driven pulley 12 and its recess below the flanged portion 13 reduces the belt tension along its upper marginal length as best shown in Figure 2 with the result that the belt is quickly induced to move toward and upon the crown of the driven pulley.

The reverse action takes place when the spindle 14 and its driven pulley 12 are returned from work performing position shown in Figure 3 to non-work performing position shown in Figure 1 and it will therefore be seen that in the construction herein shown and described, the belt is not caused to curl or wrap along its marginal lengths during the alternate axial shifting movement of the driven pulley relative to its driving pulley.

While but one specific embodiment of the invention has been herein shown and described, it will be understood that certain details of the construction shown may be altered or omitted without departing from the spirit of this invention as the same is defined by the following claim.

I claim:

A driving pulley and an axially shiftable driven pulley of a length less than the length of the driving pulley, said driven pulley having a body portion inwardly tapered toward the extremities thereof and having an outwardly rounded end portion forming a marginal flange, said body portion being inwardly tapered more sharply in its end region adjacent said marginal flange than in its middle region.

JAMES R. HARMAN.